(12) United States Patent
Phillips

(10) Patent No.: US 6,656,723 B1
(45) Date of Patent: Dec. 2, 2003

(54) ODOR CONTROLLING COMPOSITION AND METHODS OF MAKING AND USING

(75) Inventor: Jerry D. Phillips, Statesboro, GA (US)

(73) Assignee: Organic Products Co., Statesboro, GA (US)

( * ) Notice: Subject to any disclaimer, the term of this patent is extended or adjusted under 35 U.S.C. 154(b) by 98 days.

(21) Appl. No.: 09/817,651

(22) Filed: Mar. 26, 2001

(51) Int. Cl.$^7$ .................................................. C12S 5/00
(52) U.S. Cl. ..................... 435/266; 435/262.5; 422/5; 530/500; 562/513; 252/180; 423/266
(58) Field of Search .............................. 435/262, 262.5, 435/266, 277, 264; 422/4, 5; 252/179, 180, 184; 562/400, 513; 71/24; 210/610, 611, 632; 423/226, 230; 530/500, 503

(56) References Cited

U.S. PATENT DOCUMENTS

| | | | | |
|---|---|---|---|---|
| 1,700,982 A | * | 2/1929 | Hill et al. .................... | 423/225 |
| 4,319,041 A | * | 3/1982 | Goff ............................ | 562/475 |
| 5,034,045 A | * | 7/1991 | Alexander ...................... | 71/24 |

FOREIGN PATENT DOCUMENTS

| | | | | |
|---|---|---|---|---|
| JP | 59022555 A | * | 2/1984 | ............. A61L/9/01 |
| JP | 11009674 A | * | 1/1999 | ............. A61L/9/01 |

* cited by examiner

*Primary Examiner*—William H. Beisner
(74) *Attorney, Agent, or Firm*—Bruce D. Gray; Kilpatrick Stockton LLP

(57) ABSTRACT

The invention relates to a composition and method for controlling odors, the composition containing an activated lignin-derived complex containing a histosol compound, and optionally containing a hydrolytic enzyme, or at least one microorganism capable of providing the hydrolytic enzyme, or a combination of hydrolytic enzyme and at least one microorganism capable of providing the enzyme. The composition can be applied to holding tanks, portable toilets, pulp and paper mills, and other loci giving rise to noxious odors, in particular, to hydrogen sulfide emission.

17 Claims, 4 Drawing Sheets

ODOR CONTROLLING COMPOSITION AND METHODS OF MAKING AND USING

BACKGROUND OF THE INVENTION

1. Field of the Invention

The present invention relates to the reduction and control of odorous chemical compounds released during manufacturing of organic chemicals, and during organic waste control operations.

2. Description of the Related Art

Organic wastes and the offensive odors they produce, have plagued human beings since time began. When organic compounds decompose, their constituent elements are released as progressively smaller compounds and finally basic elements. This process of decomposition is performed by combinations of physical, chemical, and biochemical reactions.

The chemical nature of the organic compounds undergoing decomposition, and the dominant mechanism of the decomposition process determine to a large degree how fast the reactions occur, what by-products are released, and to what degree offensive odors are released. The ability to determine how organic materials are recycled is of great interest because the majority of organic waste produced by human activity is recycled via accelerated microbial hydrolysis, releasing undesirable compounds. The undesirable compounds include atmospheric pollutants such as hydrogen sulfide and methane.

The type of compounds released during the biochemical decomposition of organic waste is frequently determined by the organisms dominating the decomposition process. Septic organisms release chemical compounds that are considered offensive to human senses, i.e., hydrogen sulfide and methane. Aerobic organism by-products include carbon dioxide, oxygen, and water.

Chemical industries and waste processing plants have used, and continue to use, a number of concepts in their efforts to take advantage of the above listed fundamental differences between aerobic and anaerobic systems of organic recycling. These efforts include aeration systems, inoculation of waste streams with aerobic organisms, and settling ponds, with subsequent landfill of accumulated un-reacted organic pollutants.

While the above listed techniques for amplification of aerobic digestion of organic wastes have been somewhat effective, these efforts are limited by numerous critical deficiencies. These deficiencies include the cost of inoculation with a sufficient quantity of organisms, the inability of the aerobic inocula to out-compete septic organisms, and the high cost of physically aerating large bodies of effluent. These factors are in no small way responsible for release of noxious odor, as well as excessive landfill volumes.

SUMMARY OF THE INVENTION

Accordingly, this invention is directed to methods, compositions, and compounds that substantially obviate one or more of the above-mentioned problems. To achieve these and other advantages, and in accordance with the purpose of the invention, the invention is directed to an organic waste control composition that contains an activated lignin complex containing a histosol.

In yet another embodiment, the activated lignin composition may also be combined with at least one hydrolytic enzyme, at least one microorganism that is capable of producing the hydrolytic enzyme, or a mixture of one or more hydrolytic enzymes and the microorganisms capable of producing them.

Without wishing to be bound by any theory or mechanism, it is believed that the composition of the invention serves as a macromolecular sponge, adsorbing and absorbing noxious sulfur compounds, and thereby reducing the odor caused by these compounds.

In addition, the desirable histosol component of the composition typically is not prepared by conventional paper or pulp treating processes, which are much too severe to provide the activated lignin-derived complex. The activated lignin-derived complex used in the composition of the invention is therefore produced from peat or other highly degraded organic humus by a process which forms yet another aspect of the invention, and which includes:

(a) contacting the peat or humus with water and sodium carbonate to form an extraction mixture;

(b) homogenizing the extraction mixture by subjecting it to high shear mixing;

(c) adding a dispersant during homogenizing to form a homogenized, dispersed mixture;

(d) aerating the homogenized dispersed mixture.

The invention can be more clearly understood by referring to the accompanying drawings, described below, as well as to the detailed description of specific embodiments of the invention, neither of which should be viewed as limiting the scope of the invention in any way.

DETAILED DESCRIPTION OF SPECIFIC EMBODIMENTS OF THE INVENTION

Figure 1:
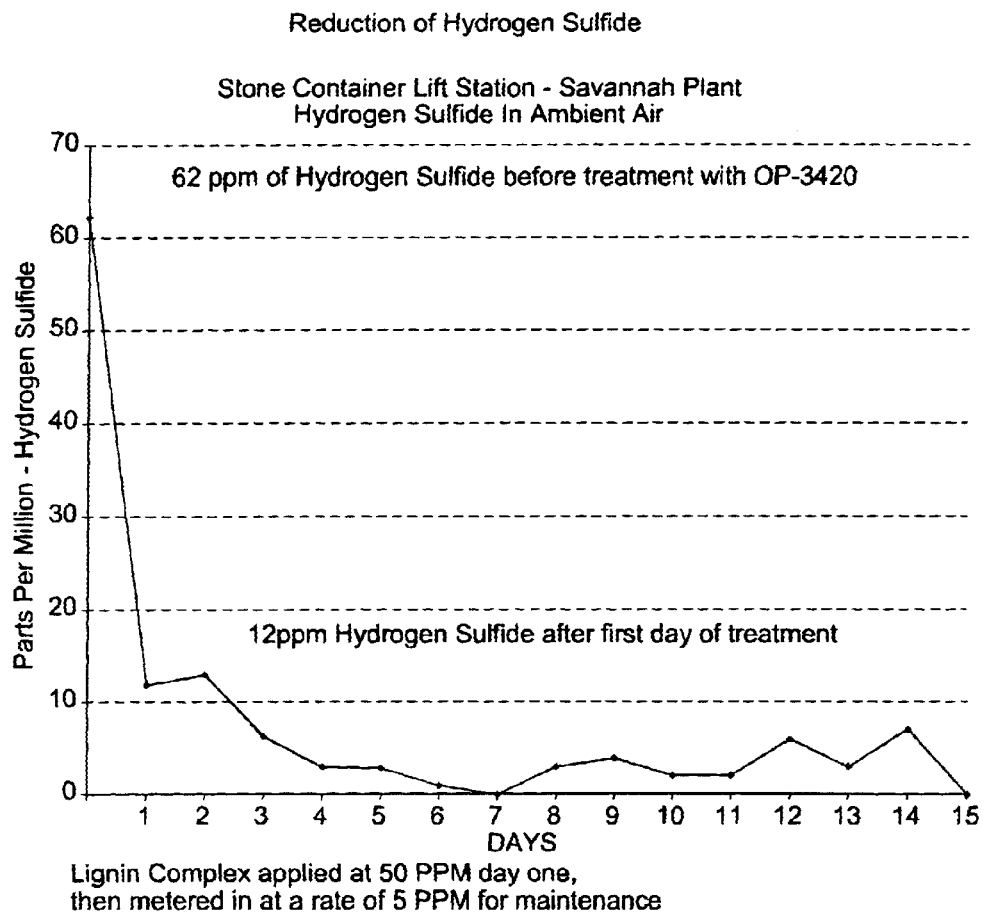
FIG. 1 is a graph that shows the reduction of hydrogen sulfide after the application of the activated lignin-derived complex of the invention at a pulp and paper mill as described in Example 2.

The activated lignin-derived complex used in the composition of the invention may contain a number of different compounds, but desirably contains one or more histosol type compounds, having one or more groups of the structural formula:

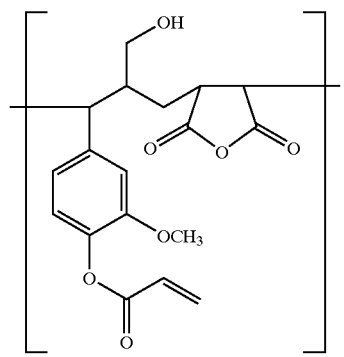

The histosol compounds in the activated lignin-derived complex contain an estimated average of seven to nine open bonding sites, a molecular surface area estimated to be approximately 900,000 square meters per kilogram, and a negative charge with a cation exchange capacity estimated to be 1,500 to 3,000 moles of charge per kilogram. The above listed combination of components provides superior odor controlling results. Similarly, when the activated lignin-derived complex is combined with a hydrolytic enzyme, or at least one microorganism capable of providing said enzyme, or a combination a hydrolytic enzyme and at least one microorganism capable of providing said hydrolytic enzyme, the results obtained are better than those obtained using the components individually, or in combination.

As described above, present pulp and paper producing technologies use conditions that are so severe that the lignin constituent of woody plant material is generally rendered inert, no longer capable of adsorbing and/or absorbing other compounds, and unsuitable for preparing the activated lignin-derived complex used in the composition of the invention. As a result, another aspect of the invention relates to a process for preparing the activated lignin-derived complex from an organic humus, such as peat. The process includes:

(a) contacting the peat or humus with water and sodium carbonate to form an extraction mixture;

(b) homogenizing the extraction mixture by subjecting it to high shear mixing;

(c) adding a dispersant during homogenizing to form a homogenized, dispersed mixture;

(d) aerating the homogenized dispersed mixture.

Additional processing steps may be included, such as adjusting the moisture content of the peat or humus, filtering the extraction mixture to remove solids, adjusting the pH of the extraction mixture to a pH of about 7.5 to about 8.8. Moreover, the precise amounts of peat or humus, sodium carbonate, dispersant, and aeration may be somewhat variable, as determined by one skilled in the art, and may depend on the precise nature of the peat or humus used, its moisture content, etc. An example of a preparation process for an activated lignin-derived complex from a particular organic humus is provided below.

EXAMPLE 1

A raw material comprising a highly degraded organic humus, known "organic peat humus" and available from Organic Products, Inc., Statesboro, Ga. was used. The humus was screened through a ⅜" vibrating screener. 500 gallons of water were added to a mixing vat and the mixing units powered on. 100-pounds of light soda ash (sodium carbonate) was added to the mixing vat and mixed for a minimum of 15 minutes. 26 cubic feet of the screened organic humus and having a moisture content of 35–40% were added to the mixing vat. 3 ounces of DrewPlus L474 foam control agent were added into the vat, and this mixture blended for a minimum of 90 minutes. The blended product was then pumped from the mixing vat onto vibrating shaker screen. The product in the shaker screen holding tank was then pumped into mixing/shearing/homogenizing tank and mixed for at least 30 minutes.

75 gallons of water were added to a separate 100 gallon mixing tank, and the mixing unit powered on. 32 ounces of Acti-Sperse FB (sodium polyacrylate solution) was added to the 100 gallon mixing tank, as were 75 pounds of Min-U-Gel 200 clay. This mixture was mixed for 30 minutes, and then pumped into the mixing/shearing/homogenizing tank. The product was then transferred to an aeration tank and aerated for 36 hours prior to shipping.

The resulting product was an activated lignin-derived complex containing highly reactive histosol compounds as described above. The addition of a hydrolytic enzyme, or at least one microorganism capable of providing said hydrolytic enzyme, or a combination of a hydrolytic enzyme and at least one microorganism is an optional step that increases the beneficial odor controlling and waste degradation properties of the composition of the invention, but is not necessary to obtain a useful composition according to the invention, and its addition in the above example can be omitted.

Each of the embodiments of the invention has been found to provide a superior substitute for conventional odor control and solid waste decomposition systems, including those using formaldehyde, such as the systems used in portable toilets and holding tanks in boats, recreational vehicles, airplanes, buses, etc. The compositions of the invention result in noticeable reduction in unpleasant odors that are associated with these waste-disposal systems.

The invention as described actually reduces odor released from effluents rather than merely masking the odors because the odor-causing materials are absorbed, and adsorbed or reacted with the composition. Formaldehydes have been shown to be deleterious to the proper functioning of sewage treatment plants. Additionally, formaldehyde is a known carcinogen. By contrast, the invention as described allows for effluents treated by the invention to be pumped into municipal waste systems, improving the ability of the system to process effluent rather than impeding performance of the system as can occur with the introduction of formaldehyde compounds.

This invention can also be used for reduction of organic solids, such as those found in waste retention ponds. Typically the solid stream from industrial manufacturing is released as a slurry into the retention pond. These ponds receive undigested organic compounds, serving as holding areas.

Often, the ponds release the by-products of the effluent stream as noxious, and degradative volatile sulfur and methane compounds. The composition of the invention releases oxygen, carbon dioxide, and water vapor, and secures sulfur, thus reducing noxious, harmful vapors and accelerating digestion of solid waste into innocuous vapors and gases.

The invention can also be used to reduce corrosion of piping, holding tanks, pumps, and other surface areas in contact with organic wastes.

While not wishing to be bound by any theory, it is believed that the composition of the invention functions to reduce odor one or more of several possible mechanisms. One possible mechanism of action involves chemical or physical absorption of pollutants by the reactive lignins in the composition. The reactive lignins in the composition of the invention appear to immobilize over 1,000 times their mass in potential pollutants.

Another potential mechanism at work in compositions of the invention is the blocking of sulfur processing sites in odor causing septic organisms by the activated lignin complex. This blocking allows beneficial aerobic organisms the ability to out-compete the odor-producing septic organisms, thus reducing the release of odor causing compounds such as hydrogen sulfide. This same mechanism also enables the preferred microorganisms to out-compete corrosion and fouling organisms for surface space in the pipes, vessels, tanks, pumps, etc., because it aids in formation of protective bio-films.

These methods and compositions herein may be used in a wide variety of systems and vessels, including, but not limited to, municipal sewage treatment systems, lift tanks, grease traps, holding ponds, animal litter, and industrial waste systems such as: pulp and paper mills, sewage treatment holding tanks as in motor homes, planes, boats, etc.

Similarly, the present invention can be used to minimize blockage due to fouling growth and solid waste accumulation in evaporators, condensers, pump stations, and tanks resulting in lower maintenance costs for these systems. The compositions of the invention are used by simply applying to the locus where odor causing materials exist.

Various aspects of the use of the invention are illustrated in the Examples below, which are not intended to limit the scope of the invention in any way:

EXAMPLE 2

A pulp and paper mill located within the city limits of Port Wentworth, Ga., is tied into the municipal waste water system for the city. The plant has been in operation for several years and complaints from the city residents and government officials escalated continuously because of the noxious odors emitted by the mill. Residents living near the mill complained about headaches and burning eyes.

The city government determined that high levels of hydrogen sulfide being emitted by the plant, either directly into the air through the scrubbers, from effluent being released into the sewers, or a combination of the two, was responsible for the hydrogen sulfide pollution problem.

The city of Port Wentworth also experienced damage to the sewer system, including blowouts near the forced mains and corrosion as high as 30.86% annually. The problems were caused by crown corrosion directly related to the effluent released by the pulp and paper mill.

Figure 2:
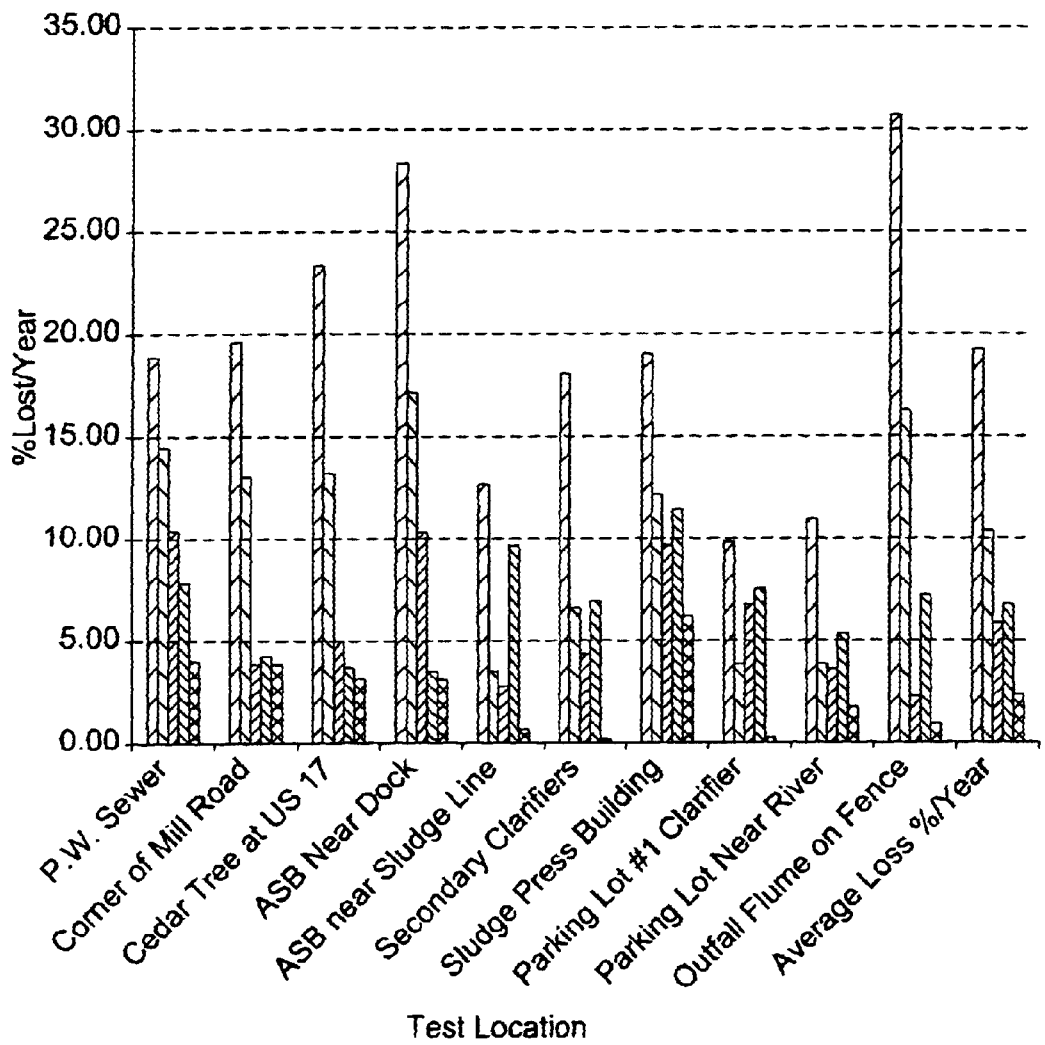
FIG. 2 is a graph that shows the copper corrosion weight loss after the application of the activated lignin-derived complex of the invention at a pulp and paper mill as described in Example 2.

The reactive lignin complex prepared as described in Example 1 was tested by introducing it to the effluent stream via the use of metering pumps. A lift station at the pulp and paper mill was generating hydrogen sulfide levels above 50 ppm. The flow rate at this station was approximately one (1) million gallons per day. The day before the introduction of the lignin solution, as described above, hydrogen sulfide readings were taken and the level of hydrogen sulfide found to be at 62 ppm. The lignin solution was metered in at 50 ppm the first day. Twenty-four (24) hours later, the hydrogen sulfide level was 12 ppm and the amount of lignin solution introduced was reduced to 5 ppm to maintain the lower level of hydrogen sulfide (FIG. 2).

Figure 3:
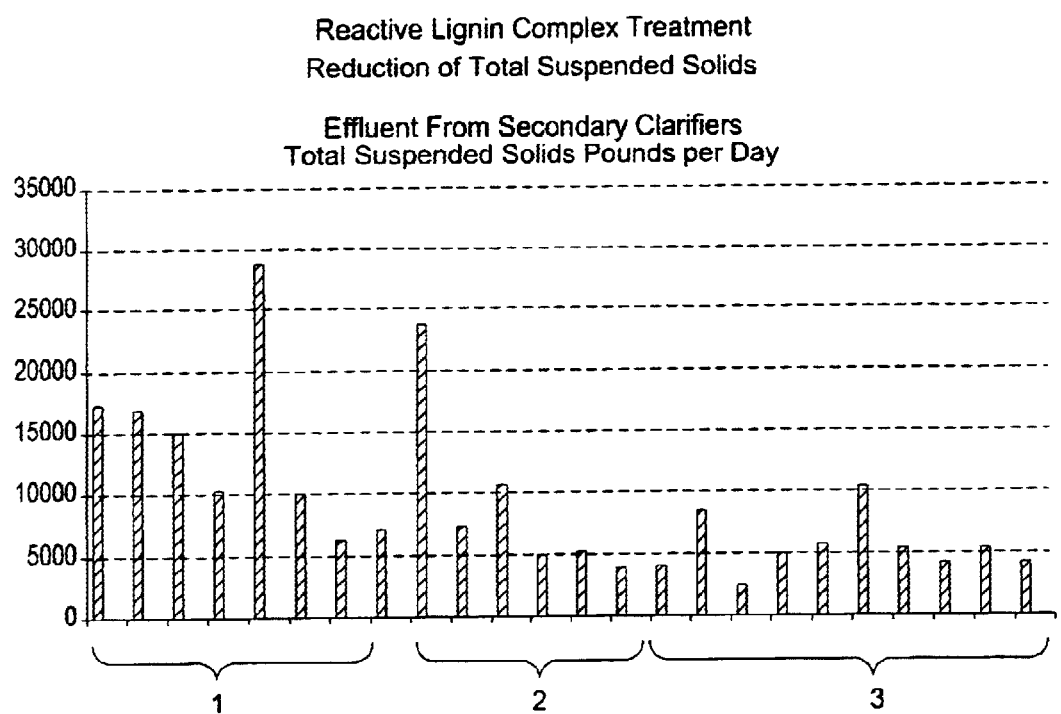
FIG. 3 is a graph that shows the reduction of total suspended solids after the application of the activated lignin-derived complex at a pulp and paper mill as described in Example 7.

The lignin solution was also injected into a plant scrubber at a rate of 25 ppm, and this rate reduced the hydrogen sulfide by 76%. By reducing hydrogen sulfide levels, the reactive lignin solution reduced corrosion levels from 19.2% annually to 2.4% based on samples taken at ten (10) test sites, over the thirty six (36) months of the test period (FIG. 3).

EXAMPLE 3

Portable toilet and pumping companies are faced with increasing resistance from the owners of waste-water treatment facilities, as well as, local, state, and federal government agencies concerning the use of formaldehyde or formaldehyde-based odor control products. The introduction of these compounds creates two major problems for treatment facilities. First, the compounds kill the beneficial microorganisms in the system. Second, the wastewater released would be unacceptable and the compounds therein are considered toxic and sometimes fatal with ingestion of even small amounts.

The reactive lignin solution described in Example 1 was tested by Waste Management Company. The tests were conducted in Southeast Georgia in the month of July with daytime temperatures above 90° Fahrenheit, with relative humidity over 90%. One ounce of the reactive solution was added to five (5) gallons of water, and this was added to a waste holding tank. Waste was added to the tank, and the tank produced no perceptible odor during the fourteen (14) day trial. The trial ended at fourteen (14) days because the holding tank was near its capacity of 40 gallons of waste.

EXAMPLE 4

The majority of odor control products marketed in the recreational vehicle industry contain toxic compounds (formaldehydes) that are harmful, or fatal, if ingested, or inhaled. Most of the products are masking agents that cover the offensive odor, released via organic waste decomposition.

The reactive lignin composition, described in Example 1, was field tested in fifty (50) recreational vehicle holding tanks. The lignin solution was added at a rate of four (4) ounces per gallon of water per forty (40) gallon holding tank, and organic waste was added to the tank in normal use. No perceptible odor was evident in any of the test units after the five (5) day test periods. The above rate of lignin solution is one half of the standard application rate for formaldehyde based chemicals.

EXAMPLE 5

Odor generated from animal waste is offensive and the effluent produced is a serious water pollutant. The use of toxic chemicals is not an option for use near livestock or pets.

Field tests were conducted by applying the reactive lignin composition as described in Example 1 to animal waste in kennels for dogs via a high-pressure hose-end sprayer at a rate of 6 ounces per gallon of water. No additional cleaning steps were required since the operators normally washed the kennels daily. The resulting odor reduction in the kennels was immediately noticeable. There were also noticeable odor reductions in the septic system, and the retention pond into which this waste was fed.

EXAMPLE 6

A Waste Management solid waste transfer station located in the center of a residential area was creating an odor problem for the residents in the community.

The odors were due to several different factors. Dumpsters at the facility produced noxious odors, the transfer physical plant was producing offensive odor as the run off from the transfer piles decomposed, and the retention pond was producing noxious fumes. There was also an erosion problem with the concrete floor of the station due to hydrogen sulfide leaching from the waste.

Tests were conducted by using the reactive lignin composition as described in Example 1 by adding this composition to the wash down cycle. The composition was applied to the dumpsters and physical plant via a pressure washer operating at 150 psi at the rate of 6 ounces per gallon of water.

There was an immediate reduction in odors from the facility. Hydrogen sulfide levels in the retention pond dropped from 70 ppm to 10 ppm.

EXAMPLE 7

Figure 4:
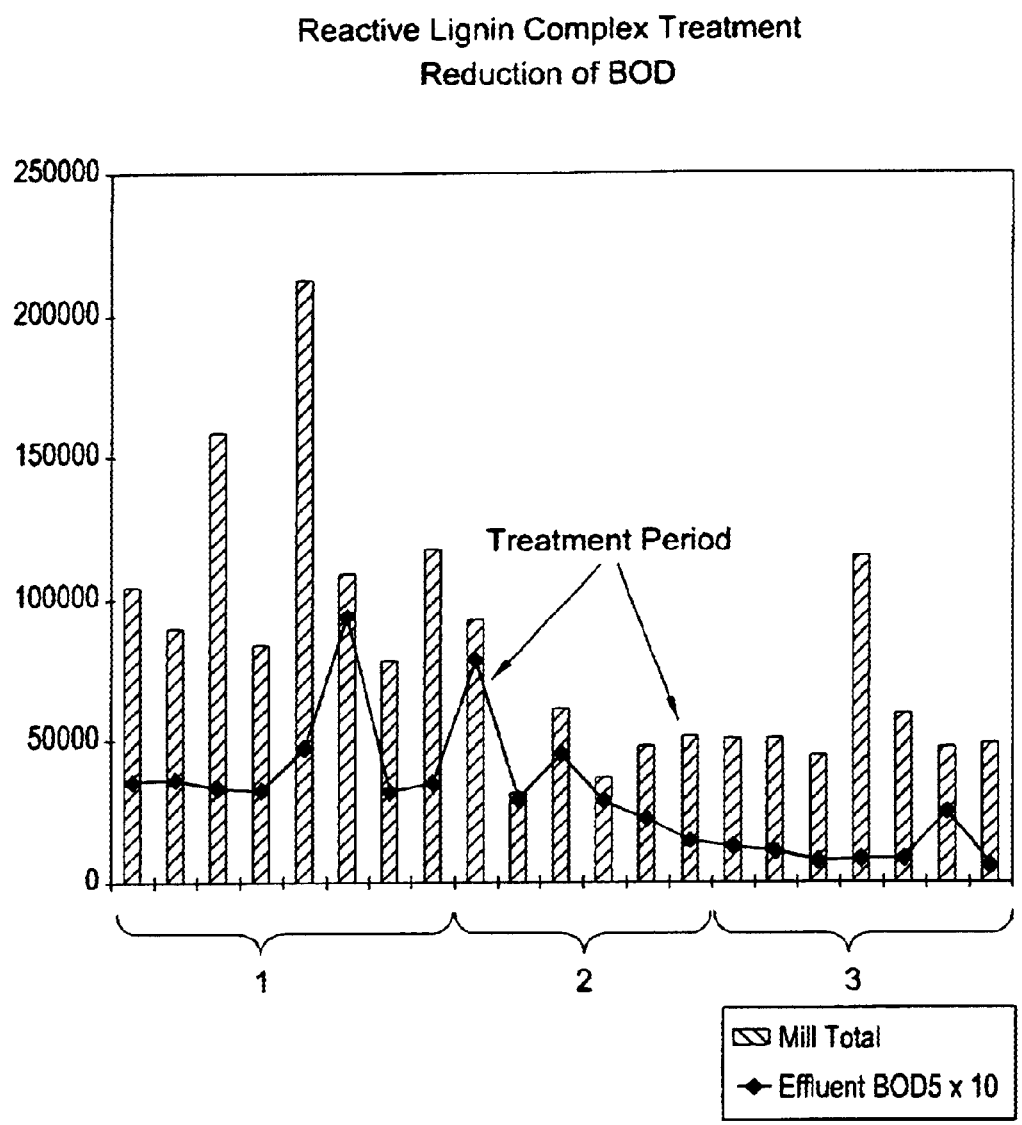
FIG. 4 is a graph that shows the reduction of BOD after the application of the activated lignin-derived complex at a pulp and paper mill as described in Example 7.

Effluent from a pulp/paper mill in Savannah, Ga., contained excessive suspended solids and imposed an excessive biological oxygen demand on the wastewater holding ponds. The ponds have a 24 million gallon waste stream. The average daily total suspended solids varies from 6,000 to 29,000 pounds, as shown by the histograms in group 1 in FIG. 3. BOD5 was also high, with levels ranging from 70,000 to 210,000, as shown by the histograms in group 1 in FIG. 4.

The pond was treated with the reactive lignin composition described in Example 1, modified to include reactive microorganisms capable of producing hydrolytic enzymes. The object of treatment was reduction of Total Suspended Solids (TSS) and BOD levels by 50% or more in a cost-effective fashion.

The above solution was added to the mill's effluent stream at the rate of 2 ppm (50 gallons per day) during a ten day test. The total suspended solids and BOD5 during this period are shown by the histograms in group 2 in FIG. 3 and FIG. 4, respectively.

Upon completion of the ten day trial, TSS levels dropped from 14,125 pounds per day to 5,810 pounds, a reduction of 58.9%, as shown by the histograms in group 3 in FIG. 3. The BOD5 level was reduced from 43,875 to 16,000, a reduction of 63.5% as shown by the histograms in group 3 in FIG. 4.

EXAMPLE 8

A commercial hog farm located in Southeast Georgia has a 5,500,000 gallon waste lagoon that had become septic. There was virtually no aerobic activity and solids accumulation was severe. The farm and pond also produced high levels of hydrogen sulfide, along with odors so noxious it became inoperable at times due to health hazards to employees.

The waste lagoon was treated with the combination of reactive lignin composition and microorganisms as described above in Example 7.

There was an immediate noticeable reduction in odor. After the 21 day test surface solids were gone, the pond water considerably clarified, and aerobic activity was pronounced, with $CO_2$, H, and $O_2/H_2O$ the primary emission gases rather than hydrogen sulfide and methane.

The barns were treated for hydrogen sulfide with the reactive lignin composition described in Example 1 at the rate of 32 ounces to 242 gallons of water in the rinse tanks. Each barn was rinsed twice per day, using two tanks of rinse water per barn. Odor reduction was immediate, as well as hydrogen sulfide levels as measured via a hydrogen sulfide meter.

The lignin solution was also used in cleaning the farrowing barn, at the rate of 6 ounces per gallon water, applied via pressure washer at 150 psi. Similar results were obtained in reduction of odor and hydrogen sulfide levels.

The above test ran for 60 days with no further loss of operations due to fume toxicity.

EXAMPLE 9

A seafood restaurant in Statesboro, Ga. had a severe problem with septic tank malfunctions. The drain fields were constantly blocked. Due to these difficulties, the tanks were pumped every two weeks at a cost of $250.00 per visit. City sewer lines could not be run to the restaurant for another 18 months, necessitating an enormous expenditure to keep the septic tanks operating.

The reactive lignin and microorganism complex as described in Example 7 was used to treat the septic system. Initially, the system was shocked with 2.5 gallons, then applied at a rate of 0.5 gallons every third day. Following the above test, the pump outs had been extended to seven to eight week intervals, instead of two weeks.

EXAMPLE 10

Automatic car wash operators are being required to reduce hydrogen sulfide levels by government restrictions. These same operations are also very interested in finding an affordable product or process that will enable them to recycle the reclaimed water in the car washes.

The reactive lignin and microorganisms in solution as described in Example 7 were added to the recovery/reclaim tanks of a car wash. The application rate was 2.5 gallons per 8000-gallon tank on day one, then the product was added at a rate of one ounce per day thereafter for 30 days. Within 72 hours of initial application, the hydrogen sulfide odors were eliminated. After the 21 st day of the test, the water in the reclaim tank was being recycled in the car wash cycle. The reactive lignin and microorganisms in solution as described in the patent also removed the minerals from the water, which resulted in a dramatic reduction in water spots on the cars after washing. The car wash reduced fresh water consumption by over 75%.

What is claimed is:

1. An odor controlling and organic waste degrading composition, comprising a chemically reactive lignin complex comprising a histosol-derived compound having one or more groups of structural formula:

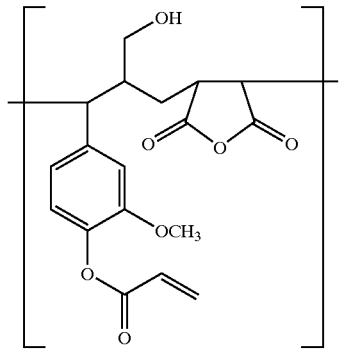

and either (a) a hydrolytic enzyme, (b) at least one microorganism capable of providing hydrolytic enzyme or (c) a combination of (a) and (b).

2. The composition of claim 1, wherein the hydrolytic enzyme or microorganism is chosen from the group consisting of amylases, lipases, cellulases, and lignases.

3. A process of producing the organic waste control composition of claim 1 comprising;

(a) contacting the peat or humus with water and sodium carbonate to form an extraction mixture, wherein the extraction mixture comprises a histosol-derived compound having one or more groups of structural formula:

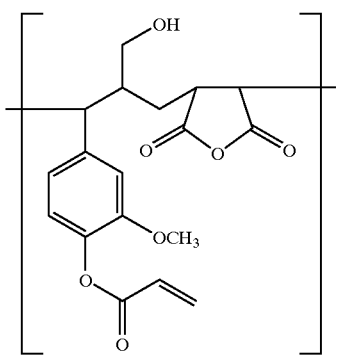

and adding either:
(1) a hydrolytic enzyme,
(2) at least one microorganism capable of providing hydrolytic enzyme or
(3) a combination of (1) and (2);
(b) homogenizing the extraction mixture by subjecting it to high shear mixing;
(c) adding a dispersant during homogenizing to form a homogenized, dispersed mixture;
(d) aerating the homogenized dispersed mixture.

4. The process of claim 3, further comprising filtering the extraction mixture.

5. The process of claim 3, further comprising adjusting the moisture content of said peat prior to contacting with water and sodium carbonate.

6. The process of claim 5, wherein said peat is adjusted to a moisture content between about 35% and about 40%.

7. A method of reducing odor causing compounds or organisms comprising applying to the locus of said odor-causing compounds or organisms an effective amount of the odor controlling composition of claim 1.

8. The method of claim 7, wherein the odor-causing compounds comprise hydrogen sulfide.

9. The method of claim 7, wherein said locus is in or near a pulp or paper mill.

10. The method of claim 7, wherein said locus is in or near a portable toilet.

11. The method of claim 7, wherein said locus is in or near an organic waste holding tank.

12. The method of claim 7, wherein said locus is in or near livestock waste.

13. The method of claim 7, wherein said locus is in or near a solid waste transfer station.

14. The method of claim 7, wherein said locus is in or near a wastewater holding pond.

15. The method of claim 7, wherein said locus is in or near a septic system.

16. The method of claim 7, wherein said locus is in or near a water reclamation tank.

17. An odor controlling composition, comprising a chemically reactive lignin complex comprising a histosol-derived compound having one or more groups of structural formula:

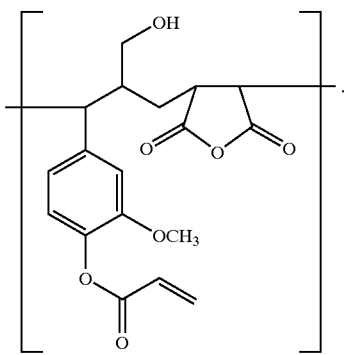

* * * * *